United States Patent Office 3,674,377
Patented July 4, 1972

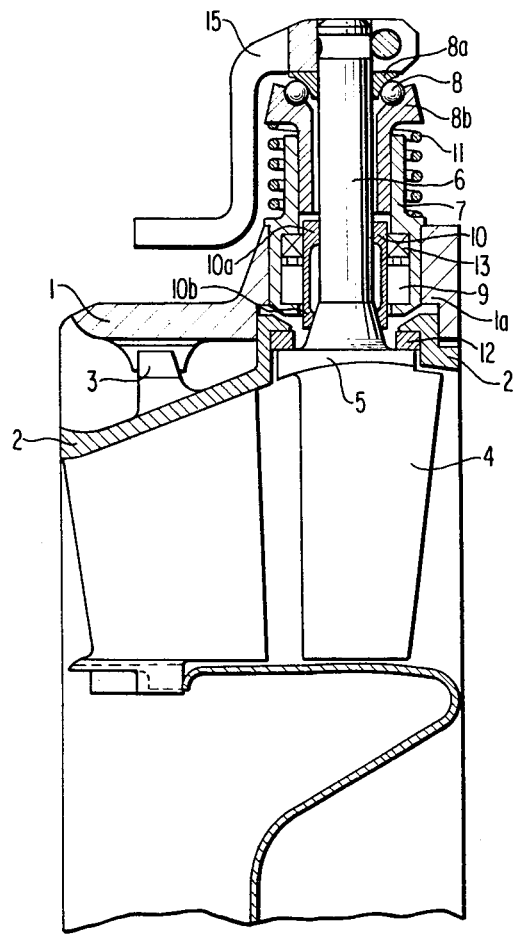
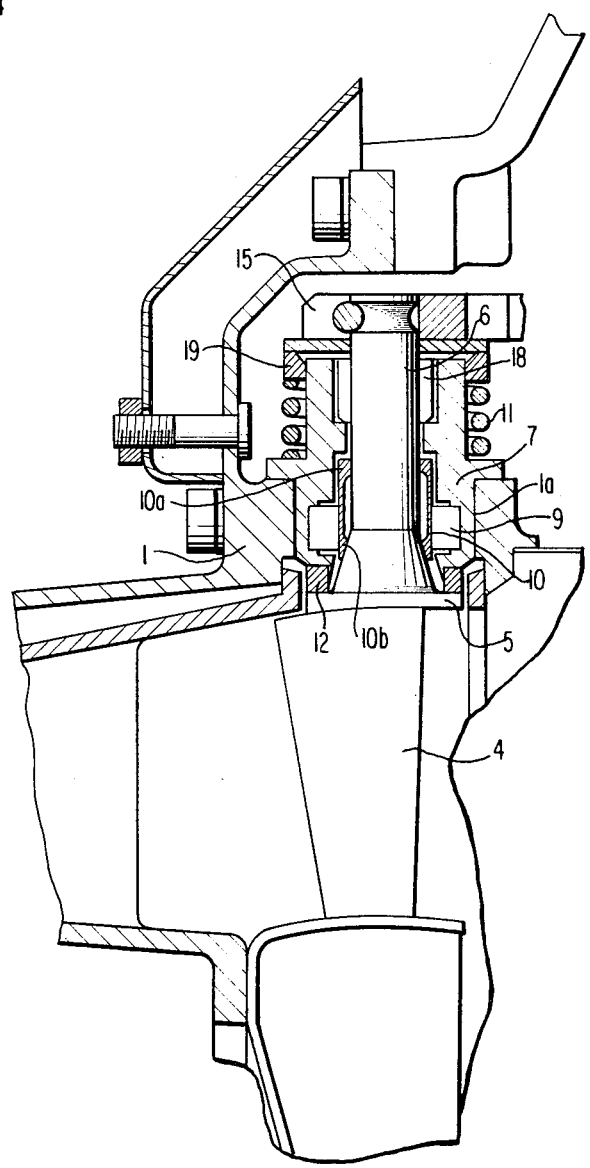
FIG. 1
FIG. 2

3,674,377
GUIDE BLADING FOR TURBO MACHINES WITH ADJUSTABLE GUIDE VANES
Klaus Trappmann, Karlsfeld, Germany, assignor to Motoren- und Turbinen-Union Muenchen GmbH, Munich, Germany
Filed June 17, 1970, Ser. No. 46,977
Claims priority, application Germany, June 19, 1969, P 19 31 044.2
Int. Cl. F04d 23/00; F01d 9/00
U.S. Cl. 415—147
17 Claims

ABSTRACT OF THE DISCLOSURE

A guide blade assembly in which a guide blade is supported by its blade shaft in the relatively fixed part by means of two bearings, of which the bearing nearer the guide blade is a roller bearing with an inner race in the form of a bush securely mounted over the blade shaft and in contact therewith only by way of two relatively narrow annular surfaces.

This invention relates to a guide blading for turbo machines, in particular for gas turbines, which include adjustable guide vanes or blades, supported at one end in a bearing support, whereby a blade shaft adapted to form an actuator shaft is supported in two bearings.

Experience has shown that the bearings of vanes or blades rotatably supported in the casing of a turbo machine are the components most susceptible to malfunction is a variable guide vane cascade or adjustable guide blading, since they are subjected to high gas temperature, yet must have small bearing clearances for accurate vane guidance so that in many cases seizing or burning occurs. Therefore, special measures have to be taken to avoid burning and seizing of the guide vane bearings.

According to one prior art system, the guide vane bearing places provided with ball bearings were located in a cool zone as far away from the guide blade as possible (DAS 1,003,512). This, however, requires a vane support at both ends which again means a more complicated design and increased constructive expenditures.

In another known arrangement, the vane or blade shaft is axially supported at its pointed ends in that at least three lateral countersunk depressions directed toward the shaft axis and disposed in the common plane of the shaft axis are provided in the shaft, into which engage points secured in the turbine casing (DAS 1,047,538). This arrangement, however, has the disadvantage that the actuating range of the vanes or blades is very limited.

In still another arrangement of the prior art, the bearing sections of the guide vanes or blades are provided with chambers and passages through which flows liquid coolant also serving as lubricant (DAS 1,247,753). This arrangement, too, is of complicated and costly design, and involves the likelihood of a certain malfunction due to the sealing problems.

The object of the present invention is to provide a guide vane cascade or guide blading operating satisfactorily under high gas temperatures which includes adjustable guide vanes or blades supported from one end, which does not require any special cooling means and has an unlimited actuating angle.

As a solution to the underlying problem, it is proposed according to the present invention to use with a guide blading of the aforementioned types, a roller bearing for the bearing support nearer to the guide blade, whose inner bearing race is a bush securely mounted on the actuating shaft, i.e., with an interference fit, and contacting the shaft only by way of two narrow annular surfaces.

The arrangement according to the present invention offers the advantage that a roller bearing is used for the bearing place within the area of the guide blade and subjected to high temperature and mechanical loads, which, due to its design, shows little tendency to seizing or burning also when not lubricated. Moreover, the heat flow from the hot blade shaft to the bearing is kept small by the inner bearing race constructed as bush and contacting the blade shaft by way of two narrow annular surfaces only. Furthermore, by virtue of its configuration, the inner bearing race has a great amount of radial elasticity so that it can be installed with a small amount of prestress, whence a bearing clearance of zero can be achieved, which is also maintained, when the bearing dimensions vary slightly due to different heat expansions of the rolling members and of the bearing outer race, on the one hand, and the bearing inner race and blade shaft, on the other.

In one embodiment of the present invention, a plain bearing or ball bearing with an axially movable bearing race, respectively, will be used for the bearing support located at a greater distance from the guide blade. The arrangement of such bearings makes possible an axial movement of the actuating shaft resulting from the heat expansion.

In order to keep the adjusting mechanism as cool as possible and in order to avoid heat-stresses far-reachingly, it is proposed according to another feature of this invention that the channel or duct guiding the gas stream is constructed as an annular gas ducting ring which is located and retained in the guide blade support by radial lugs having a radial clearance. By providing a separate gas ducting ring direct, a contact of the guide blade support with the hot gases is avoided. Moreover, the gas ducting ring held in its location by radial lugs can expand radially relative to the guide blade support.

Furthermore, the guide blading or guide vane cascade, according to the present invention, is characterized in that an annular collar arranged at the junction between the blade shaft and the guide blade is supported on a ring made of wear-resistant ceramic material, which is located in the gas ducting ring or in the bearing bush. With this arrangement, an effective sealing of the gas duct or guide channel relative to the bearing or the surrounding area is achieved, so that the bearing is not endangered by hot leakage gases.

In order to positively press and securely hold the annular collar of the blade shaft against the sealing ring under all operating conditions, according to a further feature of the present invention an axially pre-loaded spring is fitted over the blade shaft in a ring-like manner which at one end is seated against the outer side of the bearing support and at the other end against the blade shaft by way of intermediate components.

The blade shaft is pulled axially outwardly by the spring force and thus the collar of the blade shaft is pressed against the sealing ring of ceramic material.

These and other objects, features and advantages of the present invention will become more obvious from the following description when taken in conjunction with the accompanying drawing which shows, for purposes of illustration only, two embodiments of the present invention, and wherein:

FIG. 1 is a longitudinal cross section through a guide blading according to the present invention with two anti-friction bearings; and FIG. 2 is a longitudinal cross section through a guide blading according to the present invention with one roller bearing and one plain bearing.

Referring now to the drawing wherein like reference numerals are used throughout the two views to designate like parts, and more particularly to FIG. 1, a bearing bush 7 is pressed into a bore 1a of a turbine guide ring assembly serving as bearing support 1. A guide vane consisting of guide blade 4 and blade shaft 6 is supported in this bearing bush 7 by two bearings. An annular collar 5 is provided between the blade shaft 6 and the guide blade 4 of the vane. The bearing nearer to the guide blade 4 is constructed as roller bearing 9, at which is arranged a seal 13. The inner race of the bearing 9 is formed by bush 10 pressed over the blade shaft 6, which is in contact with the blade shaft 6 only by way of two narrow annular surfaces 10a and 10b, thus serving as heat barrier means between the bearing 9 and the blade shaft 6 and therewith keeping to a minimum the heat flow therebetween. In its center portion, the bush 10 is highly elastic in the radial direction so that a bearing clearance can be avoided by a small amount of prestress or interference when the bearing is installed. The second bearing of the guide vane located at a greater distance from the guide blade 4 is an angular contact roller bearing 8, whose inner race 8a is securely mounted on the blade shaft 6 whereas its outer race 8b is formed as a bush axially movable within bearing bush 7. An axially pre-loaded coil spring 11 is seated at one end against a collar of the bearing bush 7 and at the other end against the bearing race 8b so that the prestress of the spring 11 is transmitted to the blade shaft 6 by way of angular contact roller bearing 8. A ring 12 made of wear-resistant ceramic material is held in position in the bore of a gas ducting or guide ring 2. The collar 5 of the guide vane is pressed against the ring 12 by the pre-stress of the spring 11 acting in the outward direction and transmitted to the blade shaft 6 so that a stop is simultaneously provided for the axially movable guide vane and, additionally, a sealing of the gas duct or guide space relative to bearing 9 is effected. The gas guide ring 2 is located and retained in the bearing support 1 by way of radial lugs or nose portions 3 having a radial clearance. This radial clearance allows the gas ducting or guide ring 2 to expand freely relative to guide blade support 1.

The embodiment shown in FIG. 2 of a turbine guide blading according to the present invention is generally similar to the embodiment shown in FIG. 1, whence only the differences will be pointed out. The bearing nearest to the guide blade 4 is a roller bearing 9 as in FIG. 1. The second guide blade bearing disposed at a greater distance from the guide blade 4 is constructed in this arrangement as a plain bearing 18 so that also in this embodiment the guide vane is axially movably supported. In the arrangement according to FIG. 2, the spring 11, which presses the collar 5 of the guide vane against the sealing ring 12, is supported against the bearing bush 7 seated in the bearing support 1 at one end and at the other end against the support ring 19 which, in its turn, is supported against an actuating lever 15 clamped onto the blade shaft 6. In this embodiment, the sealing ring 12, consisting of ceramic material, against which the collar 5 of the guide vane is pressed, is located and retained in the bearing bush 7.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A guide blading comprising a guide blade supported on a guide blade adjusting shaft, a bearing support means and two radially spaced bearing means mounted within said bearing support means for supporting the adjusting shaft, the bearing means located closest to the guide blade being constructed as a roller bearing means having an inner and an outer bearing race, said inner race being formed by a bush means securely mounted on the adjusting shaft by way of two narrow annular portions of the bush means such that said bush means contacts said adjusting shaft only by way of respective narrow annular surfaces of said annular portions.

2. A guide blading according to claim 1, characterized in that the bearing means at a greater distance from the guide blade is a plain bearing.

3. A guide blading according to claim 1, characterized in that the bearing means at a greater distance from the guide blade is a ball bearing with an axially movable race.

4. A guide blading according to claim 1, characterized in that a gas duct means for guiding gas flow into guide blade is provided, said gas duct means being constructed as gas guide ring means which is held in position in the bearing support means by way of radial lugs having a radial clearance.

5. A guide blading according to claim 4, characterized in that a bearing bush means is inserted into the bearing support means, the two bearing means being aranged in said last-mentioned bush means.

6. A guide blading according to claim 5, characterized in that an annular collar arranged at the junction between a respective guide blade and blade adjusting shaft is seated against a ring means of wear-resistant ceramic material.

7. A guide blading according to claim 6, characterized in that said ring means is arranged in the gas guide ring means.

8. A guide blading according to claim 6, characterized in that said ring means is arranged in the bearing bush means inserted into the bearing support means.

9. A guide blading according to claim 6, characterized in that an axially pre-loaded spring is arranged in a ring-like manner about the blade adjusting shaft which at one end is indirectly supported against the outer side of the bearing support means and at the other end is supported against the blade shaft by way of intermediate components.

10. A guide blading according to claim 9, characterized in that a plurality of guide blades are provided, each of said guide blades being supported unilaterally in the bearing support means.

11. A guide blading according to claim 9, characterized in that the bearing means at a greater distance from the guide blade is a plain bearing.

12. A guide blading according to claim 9, characterized in that the bearing means at a greater distance from the guide blade is a ball bearing with an axially movable race.

13. A guide blading according to claim 1, characterized in that a bearing bush means is inserted into the bearing support means, the two bearing means being arranged in said last-mentioned bush means.

14. A guide blading according to claim 1, characterized in that an annular collar is aranged at the junction between a respective guide blade and blade adjusting shaft and is seated against a ring means of wear-resistant ceramic material.

15. A guide blading according to claim 14, characterized in that said ring means is arranged in a gas guide ring means.

16. A guide blading according to claim 14, characterized in that said ring means is arranged in a bearing bush means inserted into the bearing support means.

17. A guide blading according to claim 1, characterized in that an axially pre-loaded spring is arranged in a ring-like manner about the blade adjusting shaft which at one end is indirectly supported against the outer side of the bearing support means and at the other end is supported against the blade shaft by way of intermediate components.

References Cited

UNITED STATES PATENTS

| | | | |
|---|---|---|---|
| 2,651,492 | 9/1953 | Feilden | 415—160 |
| 2,778,564 | 1/1957 | Hoilford et al. | 415—149 |
| 2,948,460 | 8/1960 | Zeman | 415—150 |
| 2,950,084 | 8/1960 | Perry | 415—160 |
| 3,367,628 | 2/1968 | Fitton | 415—160 |
| 3,471,126 | 10/1969 | Abild | 415—110 |
| 3,525,574 | 8/1970 | Zerlauth | 415—115 |

FOREIGN PATENTS

| | | | |
|---|---|---|---|
| 1,033,677 | 10/1950 | Germany | 415—160 |
| 1,037,058 | 8/1958 | Germany | 415—160 |

HENRY F. RADUAZO, Primary Examiner

U.S. Cl. X.R.

415—160, 216